Figure 1:
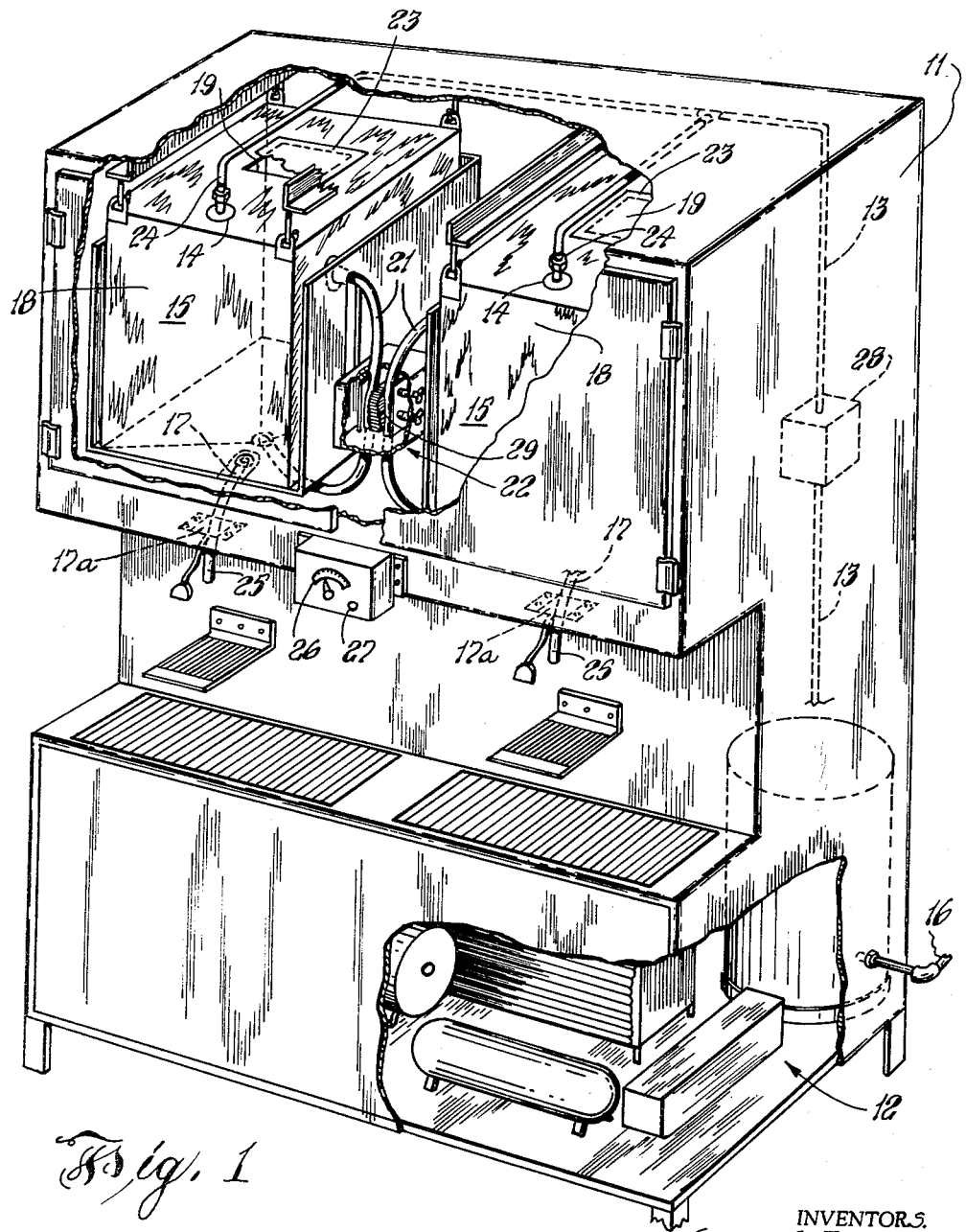

May 25, 1965 G. A. POLLAK ETAL 3,185,348
BEVERAGE RECONSTITUTING AND DISPENSING DEVICE
Filed April 4, 1963 2 Sheets-Sheet 1

INVENTORS.
GEORGE A. POLLAK
ALEXANDER SPEAR
BY
Louis B. Applebaum
ATTORNEY

May 25, 1965 G. A. POLLAK ETAL 3,185,348
BEVERAGE RECONSTITUTING AND DISPENSING DEVICE
Filed April 4, 1963 2 Sheets-Sheet 2

INVENTORS.
GEORGE A. POLLAK
ALEXANDER SPEAR
BY

ATTORNEY 3,185,348
BEVERAGE RECONSTITUTING AND DISPENSING DEVICE
George A. Pollak, Union, and Alexander Spear, Newark, N.J., assignors to the United States of America as represented by the Secretary of the Navy
Filed Apr. 4, 1963, Ser. No. 270,777
4 Claims. (Cl. 222—95)
(Granted under Title 35, U.S. Code (1952), sec. 266)

The invention described herein may be manufactured and used by or for the Government of the United States of America for governmental purposes without the payment of any royalties thereon or therefor.

This invention relates to a beverage reconstituting and dispensing system, and more particularly pertains to a system including means for reconstituting beverage concentrates and dispensing the beverages made therefrom.

Concentrated beverages, such as powdered milk, coffee and tea, have long been important items in shipboard feeding during extended operations at sea. Fresh whole milk, for instance, is generally supplied only in ports and may be carried under refrigeration for only a relatively short period of time. After this time, it is only possible to serve milk by using powdered, concentrated or frozen milk. The storage space available on present ships is generally limited, and it is a problem to carry a large supply of frozen or concentrated milk. Therefore, powdered milk must be relied upon for the supply of this beverage during extended operations.

The problem confronting the mess personnel, however, is the reconstituting and dispensing of the desired beverage in a uniformly qualitative and quantitative manner without any operational difficulties or sanitary deficiencies. The practice aboard ships at sea is to reconstitute the powdered beverage with either a hand whip or a dough mixer. After reconstitution, the beverage is dispensed by being either poured from a pitcher or ladled from a stock pot. The former practice is undesirable because the product is usually not rendered qualitatively uniform in nature and the latter practice is disadvantageous because there may be excessive loss due to operational difficulties. Further, both practices are unsanitary in nature because the beverage is open to bacterial contamination, which could render the fluidized beverage unfit or unsafe for human consumption.

We have invented a system including novel devices for the automatic and qualitatively uniform reconstitution of beverage bases or concentrates with fluid and the quantitative dispensing of the reconstituted product, as required, from a plastic, collapsible, single-service container in which the concentrate had been packaged. The system is sanitary and conforms with all pertinent health standards for the dispensing of milk as well as other beverages.

An object of this invention is to provide a system including novel devices for the reconstitution and dispensing of a beverage in a uniform manner without operational difficulties or sanitary deficiencies.

Another object is to provide an automatic beverage reconstituting and dispensing device complying with pertinent health standards.

A further object is to provide a sanitary, collapsible, single-service beverage container for use in a reconstituting and dispensing device.

Still another object is to provide a reconstituting and dispensing apparatus of improved construction, low fabrication and maintenance cost, and high durability that is facile in use under a wide variety of service conditions.

Figure 2:
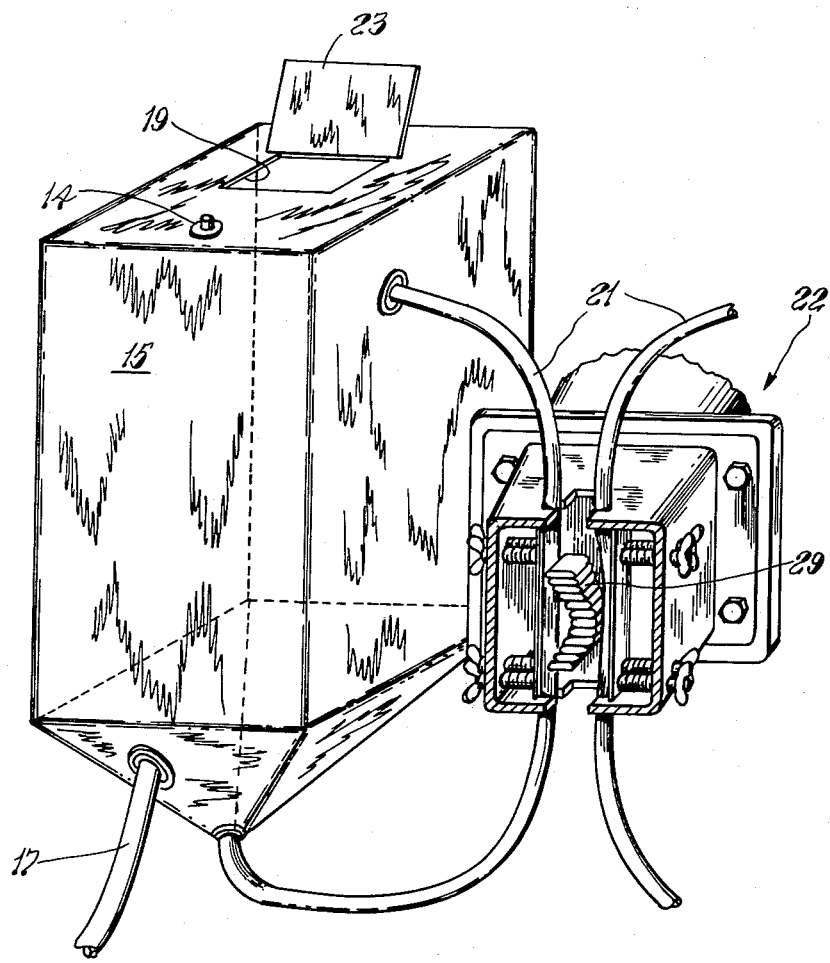

Other objects and many of the attendant advantages of this invention will be more readily appreciated as the same becomes better understood by reference to the following detailed description when considered in connection with the accompanying drawings, wherein:

FIG. 1 is a perspective view of a preferred embodiment of the beverage reconstituting and dispensing apparatus with a section cut away showing the arrangement of the elements thereof with relation to each other; and FIG. 2 is a perspective view of a preferred embodiment of the collapsible, single service beverage container for use in the reconstituting and dispensing apparatus.

Similar numerals refer to similar parts throughout the several views.

The reconstituting and dispensing apparatus illustrated in FIG. 1 is provided with a cabinet 11 having a fully self-contained refrigeration unit 12 through which passes a tubing circuit 13 one end of which communicates with an inlet fitting 14 on a collapsible, plastic single-service container 15 and the other end of which communicates with an external water supply 16. The single-service container is provided with an outlet fitting 17 operatively connected to a metering device 18a which is used to dispense the reconstituted beverage in the container 15.

As shown in FIG. 2, the collapsible, plastic container 15 for reconstituting the beverage concentrate has a body portion 18 the upper section of which is provided with a resealable opening 19 for admittance of the concentrate into the container. An inlet 14 for fluid is also provided on the container body and is operatively connected to the tubing circuit which communicates with the water supply 16. An external tube 21, one end of which is integral the upper portion of the container body 18 and the other end of which is integral the lower portion of the same body, is operatively fitted into an impulse type pump 22, as shown in FIG. 1. The latter pump is used to recirculate the fluidized concentrate from the lower portion of the container 15 through the external tube 21 into the upper portion of the container. An outlet 17 on the lower portion of the container body cooperates with a metering device 18a for the quantitative emission of the fluidized concentrate from the container.

The concentrate or beverage base, both liquid and solid, may be packaged in the collapsible, plastic, single-service container 15 by the food processor, who may then collapse the container to the volume required by the concentrate and ship it in reduced form to the consumer, ready for use in the reconstituting and dispensing apparatus heretofore described. The opening 19 in the upper portion of the container is for the admittance of the concentrate and, after the desired quantity is admitted to the container, the opening may be sealed through the use of a flap 23, as shown, and the sealed package may be shipped to the consumer. If desired, the flap 23 may be heat-sealed in position over the opening 19 when the container is made from an appropriate thermosetting material. Also, if necessary, the package may be refrigerated during transit in order to extend the life of the concentrate.

It is an easy matter for the consumer to install the container within the reconstituting and dispensing apparatus heretofore described. The apparatus, as shown in FIG. 1, is designed to receive at least two beverage containers 15. The external peripheral tube 21 on each of the containers 15 is inserted into the impulse pump 22 and the apparatus may then be turned on to reconstitute the concentrate within the caintainer. Each of the impulse pumps 22 utilized in the apparatus is designed to receive the peripheral tubes 21 from each of two containers 15.

The apparatus, as described, is provided with appropriate fittings, which may be operatively connected to the inlet 14 and outlet tubes 17 on each of the containers, for the addition of the reconstituting water to the concentrate within the container and the dispensing of the reconstituted beverage from the container. The fitting 24 communicating with the tubing circuit 13, which carries the water supply, is operatively connected to the inlet tube 14 on the container, while the fitting 17a communicating with the dispenser 25 is operatively connected to the outlet tube 17 on the same container. The apparatus is provided with a control panel 26 operated by means of a manual push-button starter switch 27 to actuate the water flow from the tubing circuits 13 into each of the beverage containers. The control panel is operatively connected to flow regulating equipment 28 on the tubing circuit for the proper metering of the correct quantity of water into each of the containers 15.

Uniform reconstitution of the concentrate is achieved through the use of the external peripheral tube 21 on each of the containers 15 in cooperation with the impulse pump 22. A suction is formed in the lower end of the tube by the action of the fingers 29 of the pump on the body of the tube. As a result, the slurry containing the concentrate and reconstituting fluid is drawn through the opening in the lower end of the tube 21 upwardly into the site of compression within the tube. The concentrate in the slurry is thoroughly dispersed throughout the fluid medium in the central portion of the tube 21 by the direct compression of the fingers 24, of the pump 22, and the fluid containing the dispersed concentrate is forced upwardly in the tube 21 and into the cavity formed by the container by the flow forces generated by the pump. Uniform reconstitution is achieved not only in the dispersion of the concentrate throughout the fluid by the wave-like compression of the pump 22 but also by agitation of the body of slurry within the cavity of the container. This agitation is provided by the withdrawal and addition of fluid from the body of the container by the action of the pump 22 on the peripheral tube 21. The arrangement described permits the reconstitution of any concentrate in a completely sanitary manner because neither the concentrate nor the reconstituting fluid come in direct contact with any of the metal parts of the pump 22. Also, this arrangement permits the reconstitution of a beverage concentrate which may contain a large amount of fruit pulp with any ratio of fluid. The reconstituted beverage, in such case, contains a considerable amount of solids in suspension but this does not interfere with the operation of the system.

It is apparent from the foregoing that the system set forth including the apparatus described is highly advantageous when utilized to reconstitute a concentrate and to dispense the reconstituted product. The system is capable of reconstituting all types of dispersible and soluble food concentrates with most fluid mediums. The presence of pulp in the concentrate does not interfere with the operation of the reconstituting mechanism, nor with the means of dispensing the reconstituted product. The apparatus, which is used in the system, is a fully self-contained unit for the automatic reconstitution of a concentrate in a uniformly qualitative manner and the quantitative dispersing of the reconstituted product. The container utilized in the apparatus is entirely sanitary because it is a single-service unit. The product cannot be contaminated after packaging because the concentrate is sealed into the collapsed container by the food processor. As a result, considerable shipping space is saved because it is no longer necessary to ship the reconstituted beverage. All that need be shipped is the collapsed container within which is sealed a measured quantity of concentrate itself. Also, there is no need to meter the flow of concentrate into water since the concentrate is quantitatively prepackaged in the collapsible, single service container. As a result, the concentrate in the collapsed container may be reconstituted by merely adding a metered supply of fluid.

Obviously, many modifications and variations of the present invention are possible in light of the above teachings. For instance, the size and shape of the body of the concrete container may be varied to suit individual needs. Also, there are numerous types of impulse pumps which may be used in the system. The pump described is designed to force liquids through a tube by the wave-like compressive action of steel fingers. However, an impulse pump utilizing steel fingers or knobs on a revolving disc may be used. Also, an eccentric or a cam-like device may be used to impart pumping action within the peripheral tube. It is therefore to be understood that within the scope of the appended claims, the invention may be practiced otherwise than as specifically described.

We claim:

1. A closed circuit system for the sanitary reconstituting of concentrates with means for dispensing the beverages made therefrom comprising, in combination:
   a collapsible sanitary, single-service, plastic container having a body portion of closed end construction housing said concentrate,
   an inlet integrally provided on said container body for admittance of fluid to said concentrate in said container,
   a tube, one end of which is integral with the upper portion of said container and the other end of which is integral with the lower portion of said container,
   an impulse pump operatively connected to said tube, said pump recirculating said fluidized concentrate from the lower portion of said container through said tube to the upper portion of said container, and
   an outlet integrally provided on the lower portion of said container for the emission of said fluidized concentrate from said container.

2. A dispensing unit for reconstituted beverage concentrate comprising:
   a refrigerated housing,
   at least one collapsible sanitary, single-service plastic container the contents of which consists of a beverage concentrate mounted in said housing,
      said container having a fluid inlet, a beverage outlet, both of which are integral with said container, and an external tube one end of which is integral with the upper portion of said container and the other end of which is integral with the lower portion of said container,
   an impulse pump mounted in said housing and operatively connected to at least one of said external tubes,
      said pump being capable of recirculating fluidized concentrate from the lower portion of said container through said tube to the upper portion of said container,
   a tubing circuit for attachment to a water supply communicating with said fluid inlet on said conainer, and
   a metering dispenser communicating with said beverage outlet on said container.

3. A collapsible, sanitary, single-service plastic container for a beverage concentrate comprising:
   a body portion having a resealable open end for admittance of said concentrate to said container,
   an inlet integrally provided on said body for admittance of fluid to said body portion,
   a tube one end of which is integral with the upper portion of said body and the other end of which is integral with the lower portion of said body,
      said tube permitting recirculation of said fluidized concentrate from the lower portion of said container to the upper portion thereof, and
   an outlet integrally provided on the lower portion of said body for the emission of said fluidized concentrate from said container.

4. A collapsible, sanitary, single-service, plastic container for a beverage concentrate comprising:
   a body portion of closed end construction housing said concentrate,
   an inlet integrally provided on said body for admittance of fluid to said concentrate in said body portion, a tube one end of which is integral with the upper portion of said body and the other end of which is integral with the lower portion of said body, said tube for use in recirculating said fluidized concentrate from the lower portion of said container to the upper portion thereof, and an outlet integrally provided on the lower portion of said body for the emission of said fluidized concentrate from said container.

References Cited by the Examiner

UNITED STATES PATENTS

| | | | |
|---|---|---|---|
| 2,618,409 | 11/52 | Eisenberger et al. | 222—105 X |
| 2,726,018 | 12/55 | Burden. | |
| 2,877,714 | 3/59 | Sorg et al. | 103—149 |
| 3,087,655 | 4/63 | Scholle | 222—105 X |
| 3,096,912 | 7/63 | Rivette | 222—105 X |
| 3,105,617 | 10/63 | Felldin | 222—185 |

RAPHAEL M. LUPO, *Primary Examiner.*

HADD S. LANE, *Examiner.*